Oct. 22, 1935.    M. H. P. SOLOGAISTOA    2,018,100
ROTARY ENGINE
Original Filed May 10, 1929    8 Sheets-Sheet 1

Inventor:
Manuel Humberto Perez Sologaistoa,
By
C. C. Hines,
Attorney.

Oct. 22, 1935.   M. H. P. SOLOGAISTOA   2,018,100
ROTARY ENGINE
Original Filed May 10, 1929   8 Sheets-Sheet 3

Fig. 3.

Inventor:
Manuel Humberto Perez Sologaistoa,
By
C. C. Hines,
Attorney.

Oct. 22, 1935.   M. H. P. SOLOGAISTOA   2,018,100
ROTARY ENGINE
Original Filed May 10, 1929   8 Sheets-Sheet 4

Inventor:
Manuel Humberto Perez Sologaistoa,
By
C. C. Hines,
Attorney.

Oct. 22, 1935.  M. H. P. SOLOGAISTOA  2,018,100

ROTARY ENGINE

Original Filed May 10, 1929  8 Sheets-Sheet 5

Inventor:
Manuel Humberto Perez Sologaistoa,
By
C. C. Hines,
Attorney.

Oct. 22, 1935.  M. H. P. SOLOGAISTOA  2,018,100
ROTARY ENGINE
Original Filed May 10, 1929  8 Sheets-Sheet 8

Inventor:
Manuel Humberto Perez Sologaistoa
By C. C. Hines,
Attorney.

Patented Oct. 22, 1935

2,018,100

UNITED STATES PATENT OFFICE 2,018,100

ROTARY ENGINE

Manuel Humberto Pérez Sologaistoa, San Pedro Sula, Honduras

Application May 10, 1929, Serial No. 361,994
Renewed January 14, 1935

6 Claims. (Cl. 60—44)

This invention relates to internal combustion engines, and particularly to internal combustion engines of the rotary type, and one object of the invention is to provide a novel construction and arrangement of parts whereby increased power and speed may be obtained, fuel losses avoided, and the number of vital working parts reduced.

A still further object of the invention is to provide a rotary internal combustion engine in which the number of working impulses per cycle is greatly increased over prior constructions of engines, and wherein the devices for producing such impulses may be controlled at will to regulate the power and speed of the engine as desired, so that in the use of the engine for driving automobiles, boats, aircraft, or other vehicles, such craft may be controlled with greater ease and celerity.

A still further object of the invention is to provide an engine whose weight, per horse-power, may be greatly reduced as compared with engines of ordinary types.

With these and other objects in view, the invention consists of the features of construction, combination and arrangement of parts, hereinafter fully described and claimed, reference being had to the accompanying drawings, in which:—

Figure 1:
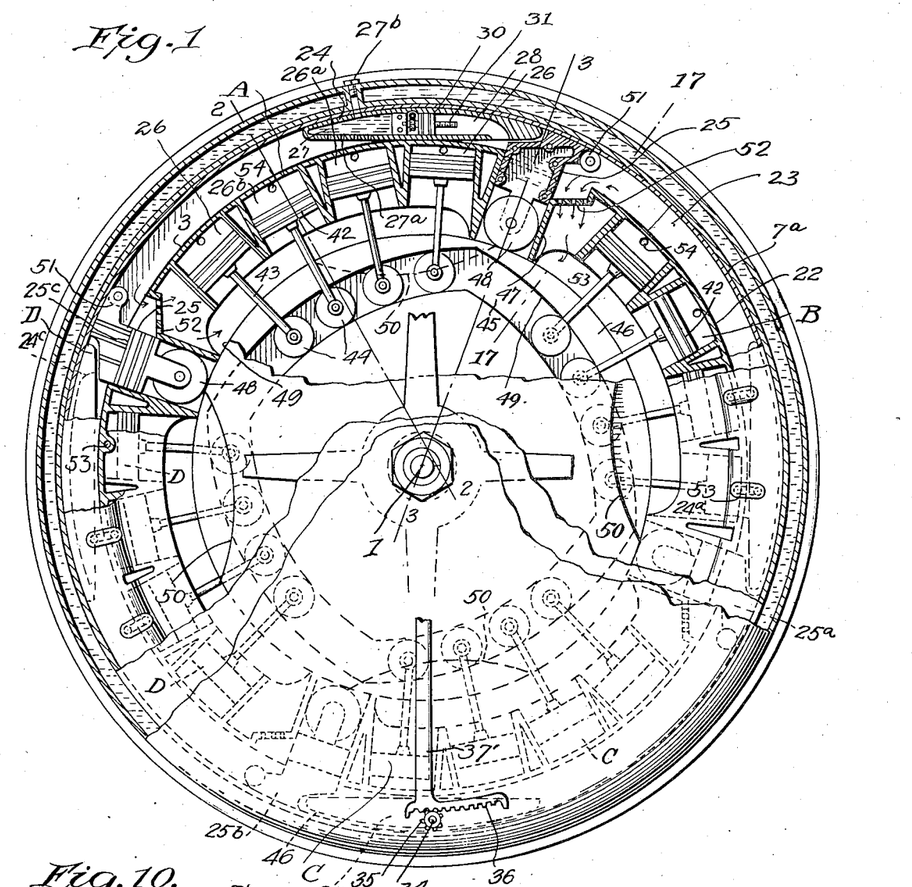
Fig. 1 is a side elevation, with parts broken away and in section, of a rotary internal combustion engine embodying my invention.
Figure 2:
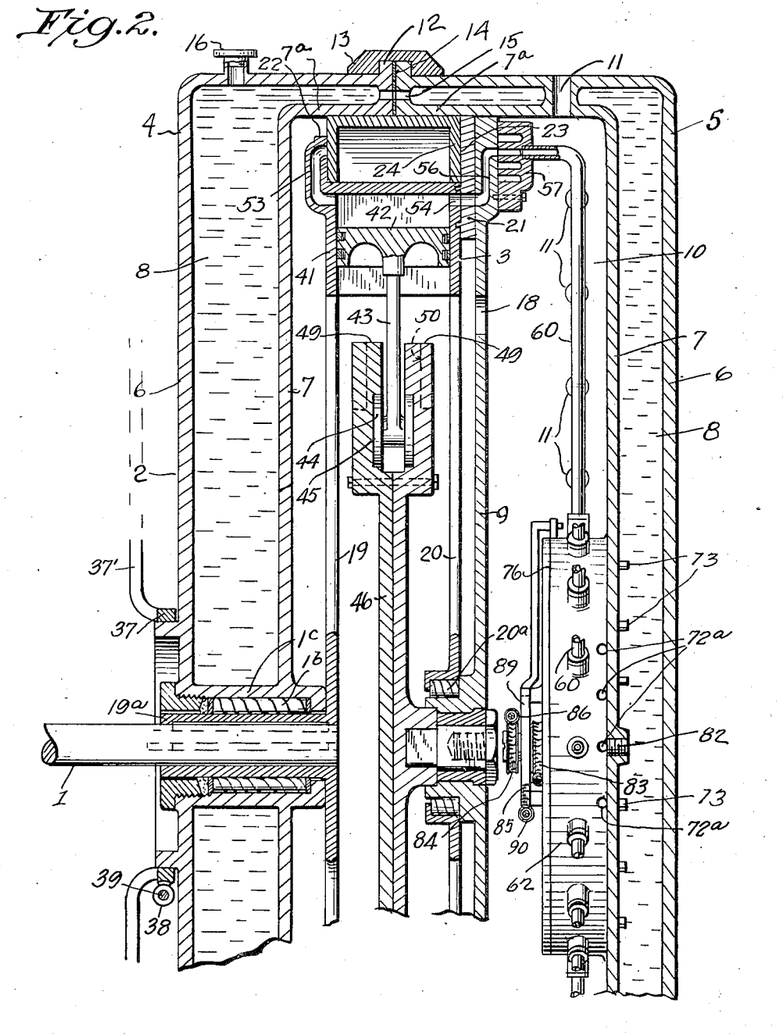
Fig. 2 is a transverse section on an enlarged scale taken on line 2—2 of Fig. 1 through a portion of the engine.
Figure 3:
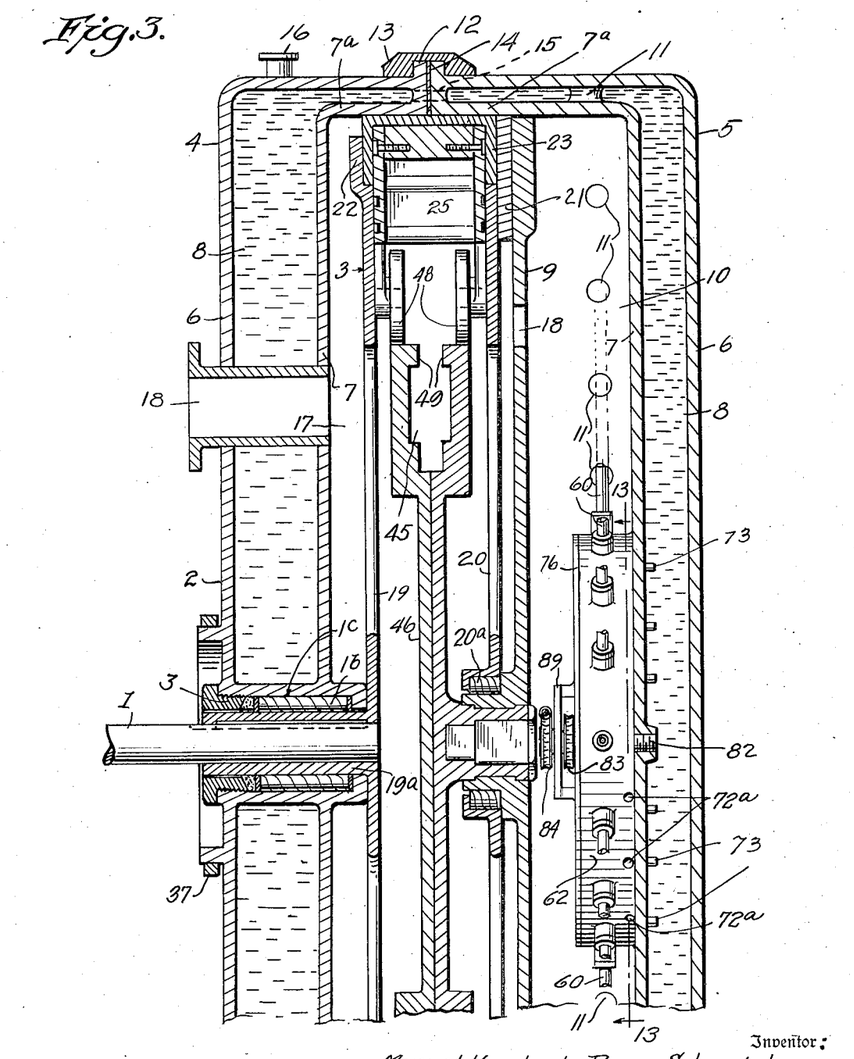
Fig. 3 is a similar section taken on line 3—3 of Fig. 1.
Figure 4:
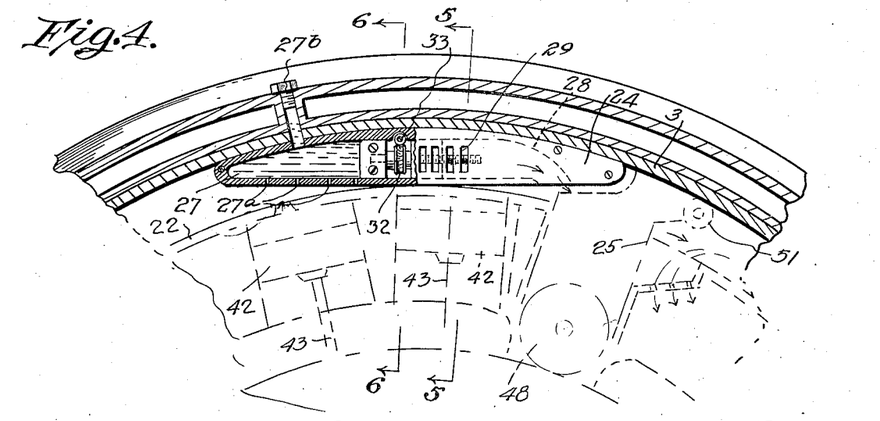
Fig. 4 is a view similar to Fig. 1 through a part of the engine, showing the stationary abutment and pressure distributor and controller partly in longitudinal section and partly in side elevation.
Figure 5:
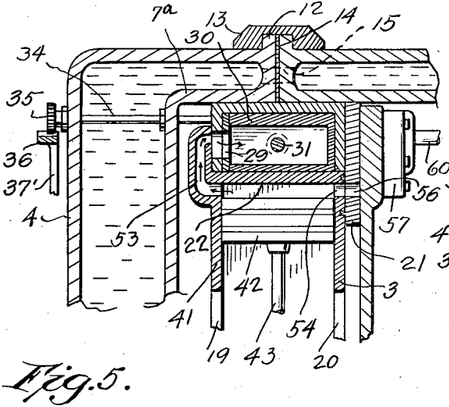
Fig. 5 is a transverse section on line 5—5 of Fig. 4.
Figure 6:
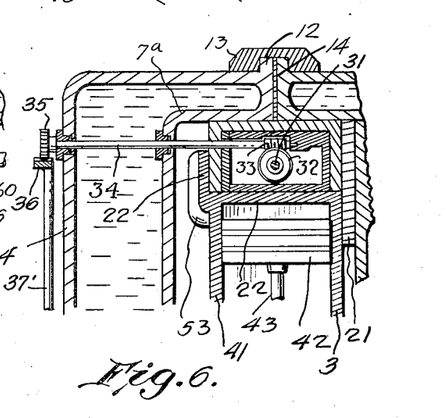
Fig. 6 is a transverse section on line 6—6 of Fig. 4.
Figure 7:
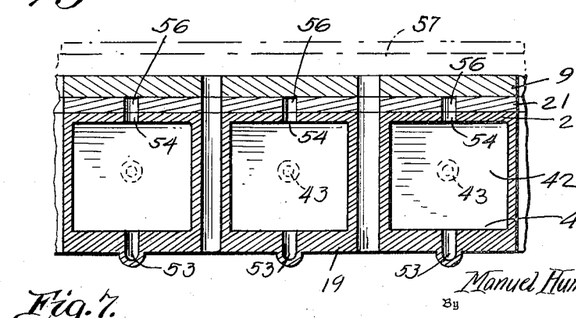
Fig. 7 is a horizontal transverse section through the engine casing and several of the piston cylinders.
Figure 8:
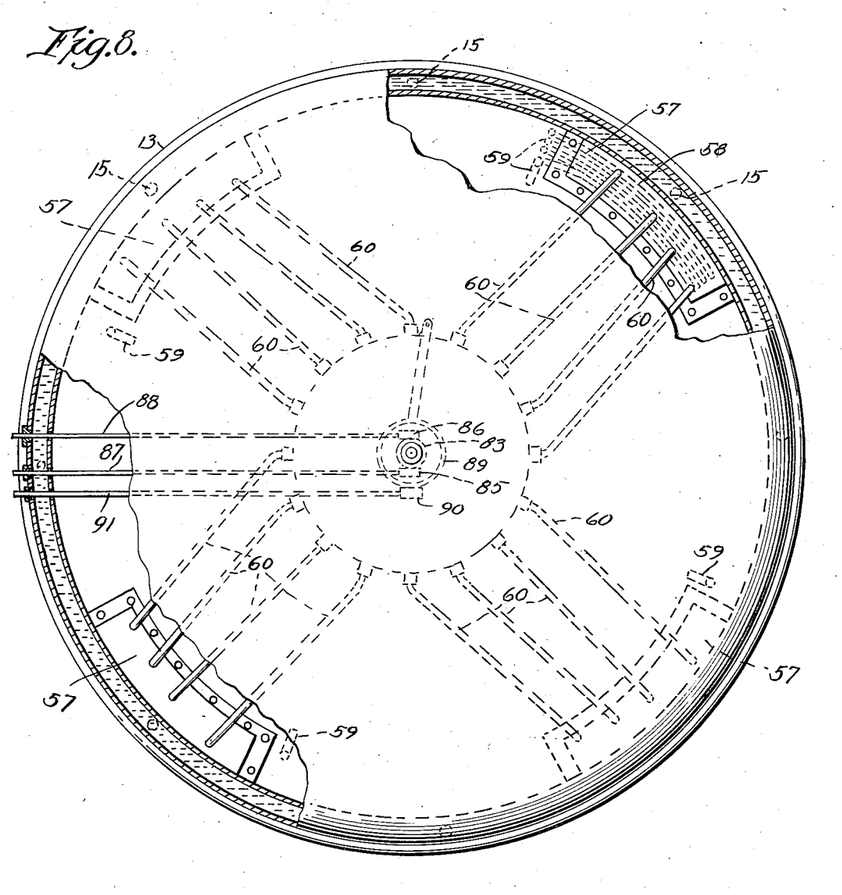
Fig. 8 is a view looking toward one side of the carburetor and mixer with portions of the adjacent side wall of its casing broken away.
Figure 9:
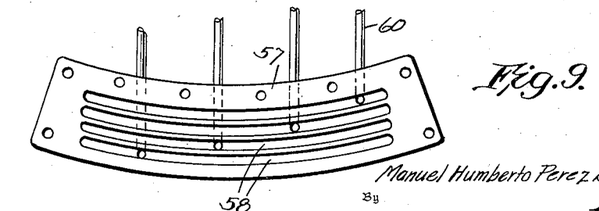
Fig. 9 is an inner face view of one of the intake manifolds.
Figure 10:
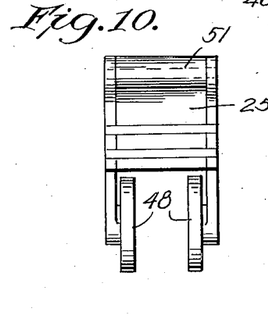
Fig. 10 is a face view of one of the movable abutments.
Figure 10A:
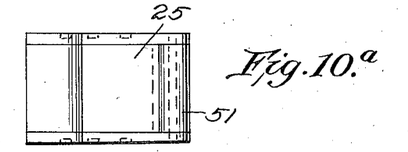
Fig. 10a is a top plan view of the same.
Figures 11, 12:
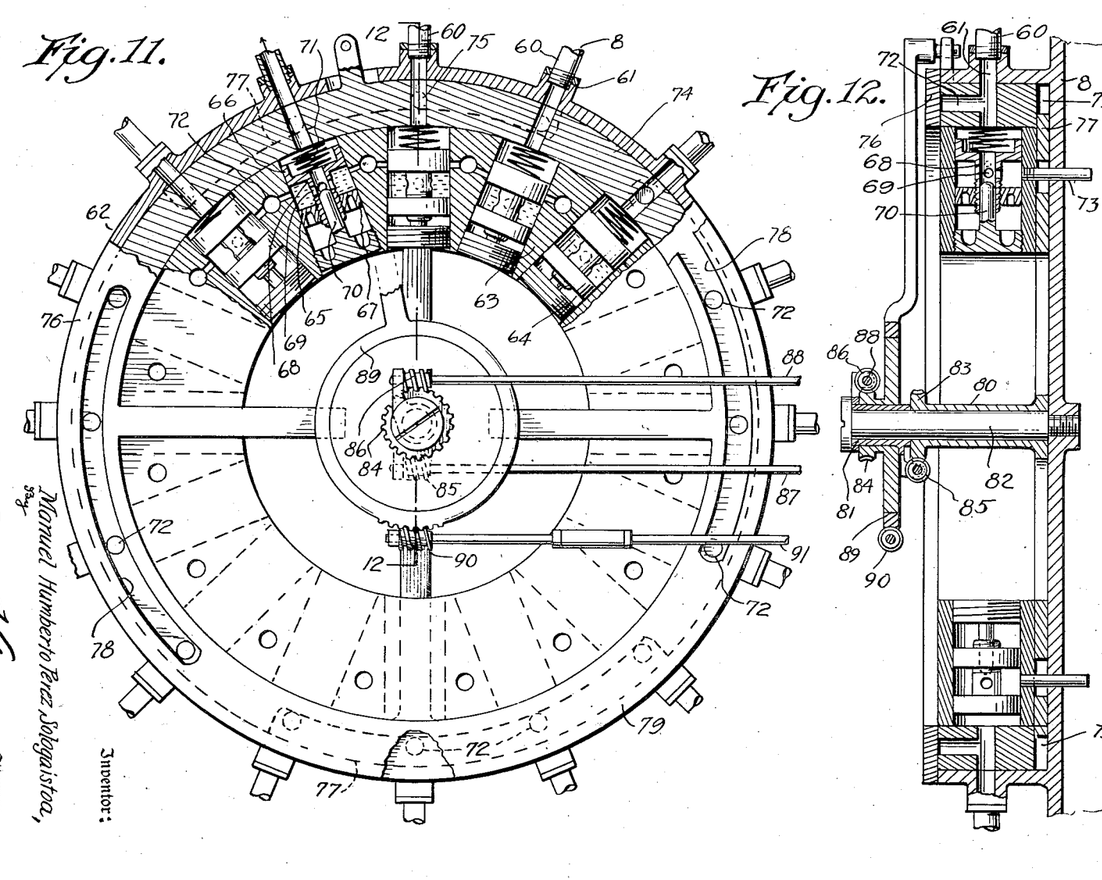
Fig. 11 is a view looking toward the opposite side of the carburetor or mixer from that shown in Fig. 8 and showing in section some of the charge mixing devices.
Fig. 12 is a section on line 12—12 of Fig. 11.
Figure 13:
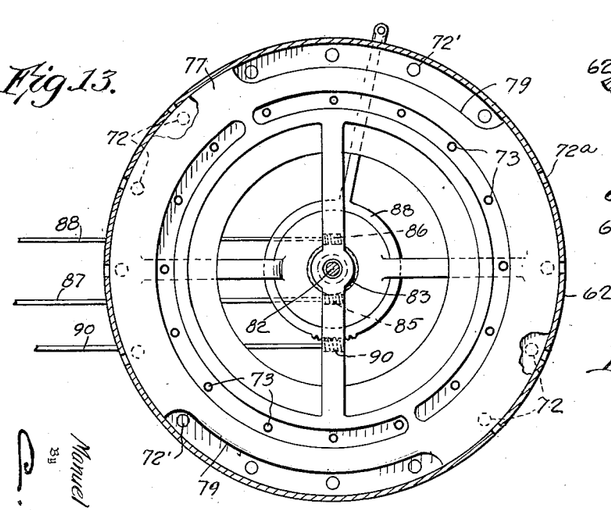
Fig. 13 is a sectional view through the carburetor or mixer taken substantially on line 13—13 of Fig. 3.
Figure 14:
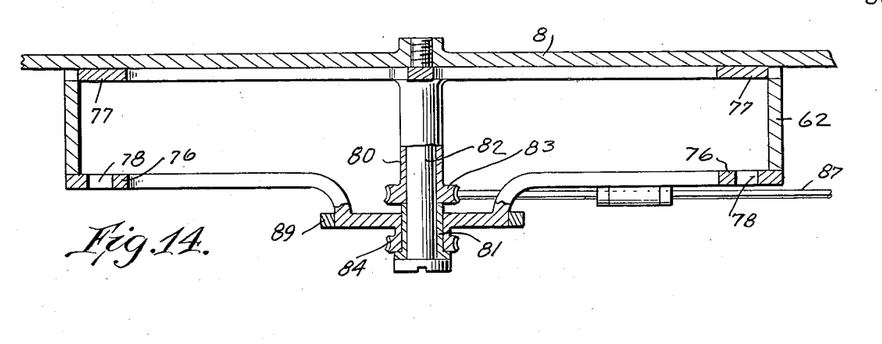
Fig. 14 is a sectional view showing adjustable members of the carburetor or mixer.
Figure 15:
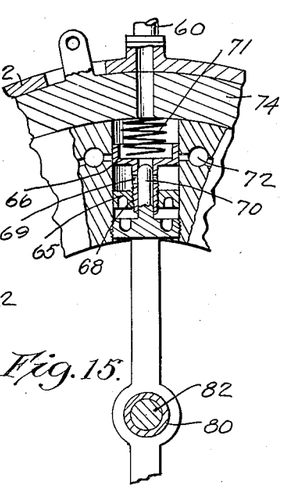
Fig. 15 is a section through one of the charge mixers showing the throttle valve ring in open position.
Figure 16:
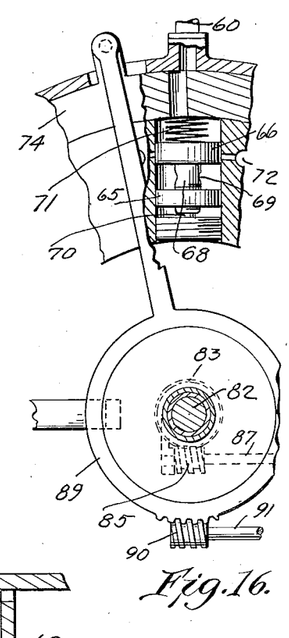
Fig. 16 is a view similar to Fig. 15 showing the throttle valve ring in partly closed position.
Figures 17, 21:
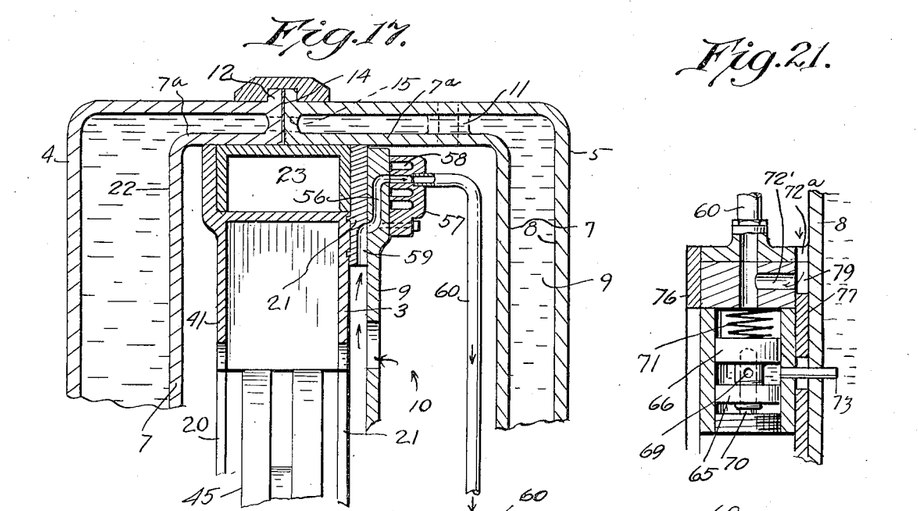
Fig. 17 is a sectional view on line 17—17 of Fig. 1 illustrating the suction relief action.
Figs. 18 to 21, inclusive, are sections through one of the charge mixers, illustrating different actions and control features thereof.
Figure 18:
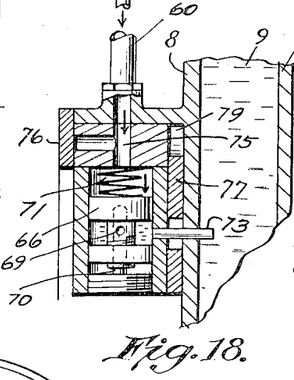
Figure 19:
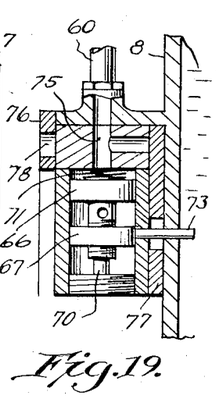
Figure 20:
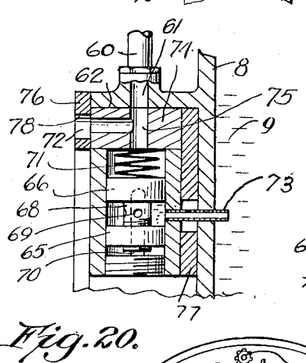
Figure 22:
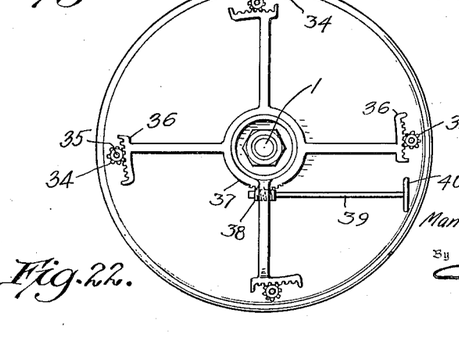
Fig. 22 is a side elevation of the engine on a reduced scale.

In the practical embodiment of the invention as herein-disclosed, I provide a rotary engine structure comprising a shaft 1, a stationary enclosing casing or stator 2, and a rotor 3. The casing 2 consists of two sections 4 and 5, divided in a direction at right angles to the shaft, and each including walls 6 and 7 spaced to provide between them storage chambers or reservoirs 8 for the gasoline or other fuel to be used, and the section 5 is also provided with a wall 9 arranged to form with the wall 7 thereof a space 10 having air inlets and exhaust outlets 11 communicating with the atmosphere. The casing sections 4 and 5 have abutting flanges 12 adapted to be engaged by a suitably constructed tie band 13 holding them properly assembled. Between these flanges suitable packing 14 may be used for sealing purposes, to prevent leakage of gases. These flanges connect the margins of the horizontal portions of the walls 6 and 7 and may be provided at suitable intervals with apertures 15 forming passages for the flow of the fuel between the fuel reservoir chambers 8 in the respective casing sections. The fuel may be introduced into the reservoirs 8 through one or more suitably closed inlets 16. The rotor 3 is arranged, as shown, in a space or chamber 17 formed between the walls 7 and 9 of the respective casing sections 5 and 6, and said chamber 17 may serve as a primary or main exhaust chamber for the spent gases and communicate through one or more primary exhaust outlets 18, (Figs. 2 and 3) with the chamber 10 and exhaust outlets 11.

The rotor 3 comprises a pair of spaced side members 19 and 20, which may be of either apertured disk or spider form. One of these members, the member 19, is provided with a hub or sleeve 19ª keyed to the shaft 1 and journaled in roller bearings 1ᵇ in a bearing box 1ᶜ formed upon walls 6 and 7 of casing section 4, while the other member 20 is journaled upon bearings 20ª on wall 9 of the casing. The members 19 and 20, together with a ring plate 21 carried by the latter, turn at their marginal edges in contact with the rim portions 7ª of the walls 7 and the member 19 has arranged, inwardly of such edges, a rim wall 22 lying opposite the plate 21 and forming with the said rim portions 7ª and plate 21 an annular channel 23. Arranged in this channel are spaced stationary abutments varying in number according to the number of movable abutments and groups of charge mixers and compressors to be used. In the present instance, four such stationary abutments 24, 24ª, 24ᵇ and 24ᶜ are shown, arranged at quarter points or at angles of 90° apart in the channel 23, and provided for cooperation with the said stationary abutments are movable abutments 25, 25ª, 25ᵇ and 25ᶜ, arranged at quarter points or 90° angles on the rotor. Also arranged on the rotor are four groups A, B, C, D of charge compressing devices, a group of such charge compressing devices being arranged between each pair of adjacent or successively movable abutments. In practice, there may be any suitable number of charge compressing devices in each group, four, denoted 26, 26ª, 26ᵇ and 26ᶜ, being employed in each group in the present instance, and those used may vary in size and capacity according to the size of the engine or number of the devices used and the number and force of the impulses to be produced for a working action of the engine and in order to maintain a smooth, regular and even continuity of rotation of the rotor.

Each stationary abutment 24, 24ª, etc. comprises a hollow body having an outer wall shaped to fit the inner casing rim surface formed by the walls 7 and having an inner wall contacting intermediately with the rim 22 of the rotor, so as to divide the channel 23 at that point, the ends of said wall being spaced from the rim 22 beyond such point both forwardly and rearwardly. The abutment is suitably divided by a partition to provide an oil or lubricant holding chamber 27 and a fluid feed passage 28, said chamber 27 having outlet perforations 27ª for the discharge of lubricant therefrom upon the surface of the rim 22 for distribution to the cylinders and pistons of the charge compressing devices A, B, C, D of the engine, the remaining portions of the engine requiring lubrication being lubricated in any ordinary or approved manner. The oil may be supplied to the chamber 27 for replenishing it when required by means of a suitable feed inlet 27ᵇ. The passage 28 opens through the forward end of the stationary abutment into the channel 23 and communicates at one side with a plurality of feed ports 29, said ports being controlled by a valve member 30 adjustable by means of an adjusting screw 31, to which is fixed a worm gear 32 receiving motion from a worm 33 mounted on a control shaft 34 for operation as hereinafter described, so that the feed of the ignited charge from the compressors to the abutment may be properly timed to accord with the ignition period of the charge, which may slightly vary as to point in the cycle of rotation of the rotor under different working conditions. The shafts 34 of the valves 30 project outwardly at one side of the engine and carry pinions 35 engaged by rack segments 36 on the arms 37' of an armed frame including a ring worm gear 37 engaged by a worm 38 on an operating shaft 39 having a hand wheel or other means 40, whereby the series of valves 30 may be simultaneously adjusted.

Each compressing device comprises a compressor cylinder 41, of square or other angular cross-section, and within which operates a similarly shaped piston 42. The pistons 42 of the charge compressors are carried by rods 43 which extend inward radially of the rotor and carry at their inner ends rollers 44 engaging cam grooves 45 carried by a cam disk 46 fixed to the stub shaft 20ª, said cam grooves presenting cam surfaces equal in number to the groups of compressors and having high and low portions for positively moving the pistons outwardly and inwardly at proper time periods for suction and compression actions. The pistons are thus positively projected and retracted by the cam surfaces. The rotor is also provided with a cylinder or guide chamber 47 for each movable abutment 25, which abutment is provided with track wheels 48 to run upon cam surfaces 49 formed by spaced rim edges of the cam disk 46, the cam tracks 49 also having high and low points for projecting and retracting the abutments 25. Preferably the low portions of the cam surfaces 49 consist of depressions 50 causing the wheels 48 to recede and the abutment 25 to move inwardly to retracted position as it passes under each fixed abutment 24. The outer ends of the movable abutments 25 are preferably formed for a close engagement, when projected, with the rim 7ª and each movable abutment is preferably provided with a friction roller 51 for easy traveling engagement with the rim 7ª and with the inner wall of each stationary abutment 24. Each movable abutment 25 is arranged just in rear of exhaust outlets 52 leading through slots or exhaust ports 53 to the exhaust chamber 17, from which the spent products of combustion may exhaust through port 18 to the atmosphere. The exhaust outlets 52 may be so formed as to receive the roller carrying portion of the movable abutment when the latter is retracted, as a result of which the outlet is closed by the movable abutment for a definite period of time.

In the operation of the engine as thus far described a fuel charge entering a cylinder 41 through an intake port 54, through the suction of the piston 42 on the suction stroke of the latter, is compressed to a very high degree of compression in the cylinder 41 on the compression stroke of the piston, sufficiently high to raise the heat of the mixture beyond the ignition point, so that ignition of the mixture will take place, at the moment that the outlet port 53 of the cylinder registers with one or the other of the ports 29 in the stationary abutment 24. When the piston 42 reaches the limit of its outstroke all of the burning and expanding gases are expelled through port 53 and the coacting port 29 and discharged into the channel 23, behind the preceding projected movable abutment 25, through the outlet passage 28 in the fixed abutment. As each charge compressor of a group, as the group A, for instance, comes into firing position, the action above-described takes place with respect to the charge compressed thereby, and the successive charges of expanding gases flow through the passage 28 of the fixed abutment with which the group is at that time cooperating and the expansion of the gases is exerted against the movable abutment 25 immediately ahead of the group so as to impart successive impulses as well as a continued impulse pressure upon the movable abutment. When the rear compressor of a group passes beyond the exhaust position, exhaust of gases from the channel 23 takes place through the adjacent outlets 52 and 53, as will be readily understood.

It will be understood that the ports 29 and their controlling valve 30 provide for a proper timing between the outlet port 53 of each charge compressing cylinder and one or more of the ports 29 for registration as each charge compressor comes into discharge position at the ignition moment. In order, also, to ensure proper registration between the intake port 54 of each charge compressor and a fuel supply port 56 in the ring plate 21, an intake manifold 57 of novel construction is provided. This manifold is provided with a series of channels or grooves 58 arranged in different parallel planes, and equal in number to a group of charge compressors, for coaction with a corresponding number of ports 56 in the ring 21 for coaction with intake ports 54 of the cylinders 41 of a group to provide for a proper supply of a charge mixture to each cylinder of a group, whether or not in its working action the cylinders are a little bit out of time. The use of separate channels in each manifold is also employed to ensure the proper time action of one charge compressor with the source of supply of fuel at a time. The plate or ring 21 is also provided at a proper point in the travel of each charge compressor beyond firing position, with a relief port 59, one for each channel 58, for connecting the channel with the exhaust chamber of the casing to prevent suction sticking of gas feed supply valves, as will be hereinafter described.

The manifolds 57 have their channels connected by groups of feed pipes 60 with the outlets 61 in the rim of the casing of a carburetor or mixer 62 supported by the plate or wall 7 on the inner side 10 of said wall. Arranged within the carburetor or mixer casing is an annular body 63 provided with valve chambers 64 containing piston feed valves 65, the valve chambers and valves being radially arranged and equal in number to the charge compressors and arranged similarly in groups, there being a feed valve of the character described for each charge compressor. Each valve member 65 is provided with a pair of spaced heads 66 and 67 connected by a hollow stem 68 having air and fuel intake ports 69. The hollow stem 68 moves on a fixed guide stem 70 which closes its ports 69 when the valve 65 is moved inwardly or retracted under the action of a spring 71. The valve chambers are in communication with air feed ports 72 extending outwardly at that side of the body 63 facing the partition 9 so as to be in open communication with the chamber 10, and the valve chambers are also in communication with fuel feed pipes 73 extending therefrom through the walls 7 into the fuel storage chamber 8. Arranged between the rim 62 and the valve chambers is a throttle ring 74 having passages 75 communicating with the outlets 61 and the pipe 60, and when said passages 75 and pipe 60 are in communication with the cylinders and the piston 42 of a charge compressor supplied by its particular feed valve 65 moves on its suction stroke, the valve member 65 is drawn outward by the suction pull in the communicating pipes 60 and opens the ports 69. The ports 69 are thus brought into communication with the ports 72 and pipes 73 and a measured amount of air and fuel will thus be supplied through the valve to the proper manifold 57 for supplying a proper charge of the fuel mixture to the charge compressing device of a group moving up to firing position. Thus it will be understood that by the provision of a valved carburetor or mixer of the character described the charge compressors will be automatically fed with measured charges of just the right amount of air and fuel for ignition and explosion in an accurately timed manner. It will also be understood, of course, that the relief ports 59 in the plate or ring 21 are provided for connecting each feed valve with the exhaust chamber 17 after such charge compressor has compressed, ignited and expelled its charge, in order that air may be supplied to the valve 65 to prevent said valve from being suction bound and in order to adapt it to be returned to closed position by its spring 71.

In order to control the speed and working power of the engine, there has been provided means whereby a certain number of the charge compressors and their valves, for example, two groups of the charge compressors out of the four groups shown, may be entirely thrown out of action or supplied with less than the normal amount of fuel in order to reduce their working force. Also, in order to control the power and speed of the engine, without the necessity of throwing any of the charge formers out of working action, means are provided for controlling the supply of fuel mixture to the charge compressors. Arranged at opposite sides of the carburetor or mixer are valve rings 76 and 77, the ring 76 having two diametrically disposed slots 78 arranged therein and the ring 77 having a pair of diametrically disposed slots 79 arranged therein and disposed at right angles to the slots 78 in the ring 76. The ring 76, through its slots, controls the supply of air through ports 72 to two working groups of the valves 65, corresponding to two working groups B and D of the charge compressors, while the ring 78, through its slots, controls the supply of air through the ports 72' to the valves of the other two groups of valves associated with the other groups A and C of charge compressors, so that by adjustment of either ring a single one, or any number of the charge compressors of the groups controlled thereby may be cut out of action by closing the air feed ports 72 and/or ports 72' leading to their valves, and thus preventing the valves 65 so deprived of air from moving under a suction pull and consequently preventing any feed of fuel to such charge compressors. In view of the number of charge compressors and valves employed, and the infeasibility or inconvenience of controlling all valves from one side of the carburetor or fuel mixed, the valve rings 76 and 77 are arranged, as disclosed, at opposite sides of the carburetor and the air feed ports 72 and 72' of the valves of dissimilar groups open outwardly at opposite sides of the carburetor, ports 72' communicating when open through the slots 79 with ports 72a in the periphery of the carburetor casing, so as to be properly controlled by the respective valve rings. The means for governing the speed of the engine while maintaining control over all charge compressors and valves comprises the throttle ring 74 and means for adjusting the same to move its ports 75 to a greater or less extent out of communication with the suction pipe 60, so as to reduce the suction pull on all valves simultaneously, to a greater or less extent, thus entirely cutting off or reducing to a greater or less extent the amount of fuel supplied to the charge compressors and thereby governing the speed and power of the engine. The adjustability of the ring 74 provides a means for exerting a speed controlling action on the engine, so that, by the controlling means disclosed, the engine may be mounted directly upon a drive shaft and the power and speed of the shaft governed as desired. The rings 76 and 77 are connected by arms to sleeves 80 and 81 mounted on a stationary rod or shaft 82. On said sleeves 80 and 81 are worm wheels 83 and 84 engaged by worms 85 and 86 operable by rods 87 and 88, whereby said rings 76 and 77 may be adjusted and locked in adjusted position. The ring 74 is connected by arms with a ring 89 turning loosely on the sleeve 81 and having worm gear teeth meshing with a worm 90 on an operating rod 91, whereby the ring 74 may be adjusted and locked in adjusted position.

In starting this motor, it may be cranked in the usual way, and by a spinning operation a fly wheel effect is established, giving great speed with a small amount of applied power, so that compression and ignition of the fuel charges by the charge compressors may be quickly effected for starting the engine. Where the engine is one of great size, and cranking would be inconvenient or infeasible, a small starting motor of suitable type may be employed for a starting action.

Having thus fully described my invention, I claim:—

1. In a rotary engine, a casing defining an annular chamber, a shaft extending into said chamber through one side of said casing, a partition in said chamber, stationary abutments in said chamber spaced from each other circumferentially thereof at one side of said partition and each formed with a passage opening through one end, a rotor in said chamber fixed to said shaft and turning about a hub projecting from said partition, an annular cam element in said chamber encircled by said rotor and having sets of cam surfaces, movable abutments carried by said rotor in spaced relation to each other circumferentially thereof and engaging one set of cam surfaces for guidance past the stationary abutments as the rotor turns, compressors carried by said rotor between the movable abutments and consisting of cylinders having pistons slidable therein and reciprocated by the other cam surfaces, a carburetor in said chamber at the opposite side thereof from said rotor having pipes leading therefrom and communicating with the cylinders through ports in the partition whereby fuel may be drawn into the compressors and highly compressed and delivered in an ignited condition through passages of the stationary abutments to act against the movable abutments and rotate the rotor, and means for controlling operation of said carburetor.

2. A rotary engine constructed as set forth in claim 1 wherein the engine casing has spaced inner and outer walls to provide a fuel reservoir and the carburetor is secured against the inner wall and provided with feed pipes extending through the inner wall into the reservoir.

3. A rotary engine constructed as set forth in claim 1 wherein the engine casing has spaced inner and outer walls defining a fuel reservoir and the carburetor consists of an annular casing secured against the inner wall of the engine casing and divided into cylindrical chambers communicating with the fuel reservoir, valves slidable in said chambers to control flow of fuel into said chambers, and means controlling the flow of fuel out of the chambers through the pipes leading from the carburetor and communicating with the compressors through said partition.

4. A rotary engine constructed as set forth in claim 1 wherein the engine casing has spaced inner and outer walls defining a fuel reservoir and the carburetor consists of an annular casing secured against the inner wall of the engine casing and divided into cylindrical chambers communicating with the fuel reservoir, suction valves slidable in said chambers to control the flow of fuel into and through said chamber, and an annular band movable into and out of position to admit air and control flow of fuel out of the cylindrical chambers into the pipes leading to the condensers.

5. A rotary engine constructed as set forth in claim 1 wherein the cam element consists of a disk having a rim portion provided with spaced side walls defining a circumferentially extending channel receiving the piston rods of the compressors and having a series of arcuate cam surfaces each engageable by the piston rods of a set of compressors whereby the pistons of each set of compressors may be progressively moved into and out of a compressing position and corresponding compressors of the sets simultaneously moved, the rims being provided with spaced arcuate surfaces for engagement by the movable abutments to permit movement thereof past the stationary abutments in timed relation to rotation of the rotor and movement of the compressors.

6. A rotary engine constructed as set forth in claim 1 wherein the cam element consists of a disk having a rim portion provided with spaced side walls formed with circumferentially spaced arcuate surfaces engageable by the movable abutments to guide the same past the stationary abutments as the rotor turns, said rim defining a channel receiving rods of the compressor pistons and formed with cam surfaces each engageable by all the rods of one set of compressors whereby the compressors of each set may be successively moved in a compressing direction as the cooperating movable abutment passes a stationary abutment and jets of compressed and exploded fuel act successively thereon to rotate the rotor.

MANUEL HUMBERTO
PÉREZ SOLOGAISTOA.